United States Patent [19]

Yamada et al.

[11] 4,028,119
[45] June 7, 1977

[54] PROCESS FOR PREPARING RESINS FOR USE IN PRINTING INK

[75] Inventors: Koichi Yamada; Teijiro Morimoto, both of Iwakuni; Yoshioki Yoshioka, Waki, all of Japan

[73] Assignee: Mitsui Petrochemical Industries, Ltd., Tokyo, Japan

[22] Filed: Feb. 4, 1975

[21] Appl. No.: 547,028

[30] Foreign Application Priority Data

Feb. 5, 1974 Japan .............................. 49-14149

[52] U.S. Cl. .................................. 106/32; 106/27; 106/28; 106/29; 106/30; 106/31; 106/289; 260/27 BB
[51] Int. Cl.² ......................................... C09D 11/00
[58] Field of Search ................................ 106/27–32, 106/27 BB; 260/27, 78.4 D, 82, 82.1, 80.7

[56] References Cited

UNITED STATES PATENTS

| | | |
|---|---|---|
| 3,468,829 | 9/1969 | Yoshioka et al. ............... 106/30 X |
| 3,468,837 | 9/1969 | Wheeler et al. .............. 260/78.4 D |
| 3,775,381 | 11/1973 | Hayashi et al. ................... 260/82 X |
| 3,825,624 | 7/1974 | Hirai et al. ............... 260/78.4 D X |
| 3,887,641 | 6/1975 | Tsuchiya et al. ......... 260/78.4 D X |

Primary Examiner—J. Ziegler
Attorney, Agent, or Firm—Sherman & Shalloway

[57] ABSTRACT

A process for preparing resins for use in printing inks, which comprises co-polymerizing at least 50% by weight of dicyclopentadiene and not more than 50% by weight of another cationically polymerizable monomer in the presence of a Friedel-Crafts polymerization catalyst, adding 1 to 20% by weight, based on the weight of the resulting co-polymer, of an $\alpha,\beta$-unsaturated carboxylic acid or its anhydride to the resulting copolymer, and then esterifying the resulting adduct at last partially with a polyhydric alcohol.

15 Claims, No Drawings

PROCESS FOR PREPARING RESINS FOR USE IN PRINTING INK

This invention relates to a process for preparing resins for use in printing inks, and more specifically, to a process for preparing resins for use in printing ink which have good solubility in aliphatic hydrocarbon solvents, permit good dispersion of pigments, and give printed films having superior drying property and gloss.

Printing ink usually consists of a solution of a resin in a solvent and/or a drying oil dispersed therein, a pigments and auxiliary agents. The resin is an important component which dominates the drying property and color of the printing ink and the gloss of the printed surface, and care must be taken in its selection.

In offset printing processes, aliphatic hydrocarbon solvents not attacking the rubber blanket are used. In gravure printing processes, it has been the previous practice to use such solvents as an aromatic hydrocarbon (e.g., toluene or xylene), an alcohol (e.g., propyl alcohol) or a ketone (e.g., methyl isobutyl ketone), but such solvents have recently been superseded by aliphatic hydrocarbon solvents because of environmental sanitary considerations.

Resins used as vehicles for printing ink have therefore been required, first of all, to be readily soluble in solvents of the aliphatic hydrocarbon type. Moreover, with a recent advance in high speed printing techniques, printing inks are required to have superior drying properties. It is also necessary that such resins promote the dispersion of pigments uniformly and finely in vehicles, and that the printed surface obtained by using the printing ink so prepared has superior color and gloss.

Natural resins such as rosin, shellac, zein, lime-rosin, phenol-modified rosin, polymerized rosin, rosin esters, or maleic-modified rosin have frequently been used which meet the above requirements at least partly. The natural resins, however, have the defect that their quality is not always uniform and their supply is unstable, and there has been a great demand for synthetic resins which can replace these natural resins.

So far, the use of synthetic resins such as petroleum resins, modified alkyd resins, polyamide resins, coumarone-indene resins, chlorinated rubbers or cellulose derivatives has been proposed, but these synthetic resins have proved unsatisfactory for practical purposes because they suffer from the defects that they have poor solubility in aliphatic hydrocarbons, the drying properties of printing inks using such resins are poor, and they exert adverse affects on the dispersion of pigments.

It has been strongly desired therefore to develop resins for printing ink which have superior properties equal to, or excelling, those of the natural resins.

It is an object of this invention to provide synthetic resins for printing ink which meet these requirements.

Another object of this invention is to provide a process for preparing synthetic resins for use in printing ink which have good solubility in aliphatic hydrocarbon solvents, permit superior dispersion of pigments, and give printed surfaces having good drying properties and gloss.

Still another object of this invention is to provide a printing ink composition containing such a synthetic resin.

Other objects of this invention along with their features and advantages will become apparent from the following description.

According to this invention, there is provided a process for preparing resins for use in printing inks, which comprises polymerizing 50 to 100% by weight of dicyclopentadiene and 50 to 0% by weight of a cationically polymerizable monomer in the presence of a Friedel-Crafts catalyst, adding to the resulting polymer 1 to 20% by weight, based on the weight of the polymer, of an $\alpha,\beta$-unsaturated carboxylic acid or its anhydride, and then esterifying the resulting adduct at least partially with a polyhydric alcohol.

According to the process of this invention, 50 to 100% by weight of dicyclopentadiene and 50 to 0% by weight of a cationically polymerizable monomer are polymerized in the presence of a Friedel-Crafts catalyst to form a homopolymer of dicyclopentadiene or a copolymer of dicyclopentadiene and not more han 50% by weight of a cationically polymerizable monomer.

The term "cationically polymerizable monomer", as used in the present specification and appended claims, denotes a compound having at least one double bond capable of being cationally polymerized with a cationic polymerization catalyst such as a Bronsted acid or Lewis acid. Typical examples of such monomer include vinyl aromatic hydrocarbons containing 8 to 12 carbon atoms such as styrene, vinyl toluene, tert-butylstyrene, $\alpha$-methylstyrene or o-, m- or p-methyl $\alpha$-methylstyrene; aromatic cyclic vinyl monomers such as indene or methylindene, aliphatic monolefins containing 4 to 12 carbon atoms such as butene, pentene or hexene, aliphatic diolefins containing 4 to 12 carbon atoms such as butadiene or isoprene, and unsaturated alicyclic hydrocarbons containing 5 to 15 carbon atoms such as cyclopentadiene, methyldicyclopentadiene, norborene, alkylnorbornenes or alkenylnorbornenes. These monomers are used either alone or in combination of two or more in copolymerizing with dicyclopentadiene.

Of the above cationically polymerizable monomers, the vinyltoluene, indene, and isopropenylnorbornene are especially preferred.

In the present invention, however, it is advantageous and preferred to use a fraction having a boiling point of 20° to 300° C. and containing unsaturated hydrocarbons, especially a fraction having a boiling point of 140° to 280° C. and containing 50 to 100% by weight of aromatic hydrocarbons, which are obtained as by-products in the cracking or reforming of petroleum, instead of the respective monomers described above.

Generally, heavy petroleum fractions such as light naphtha, heavy naphtha and gas oil can be cracked within short periods of time and at a comparatively low tressure in the presence of steam at a temperature of 500° C. to 900° C. Hydrocarbons resulting from such a steam cracking process usually consist of major proportions of unsaturated hydrocarbons (i.e., olefins, diolefins and aromatic hydrocarbons) and minor proportions of saturated hydrocarbons (i.e., paraffinic and naphthenic hydrocarbons).

A fraction boiling at above 140° C. and having at least 8 carbon atoms, which is derived from the above hydrocarbons by continuous fractional distillation to remove a fraction containing 1 to 7 carbon atoms, contains large amounts of unsaturated hydrocarbons. For example, a fraction boiling at 140° to 280° C. usually has the following composition.

| | |
|---|---|
| Styrene, indene and their derivatives | 30 to 60% by weight |
| Olefins | 5 to 10% by weight |
| Aromatics | 20 to 40% by weight |
| Paraffins and naphthenes | 10 to 20% by weight |
| Diolefins | 0 to 5% by weight |

The amount of the above cationically polymerizable monomer is up to 50% by weight, preferably up to 40% by weight, more preferably 10 to 40% by weight, based on the total weight of it and the dicyclopentadiene.

Homopolymerization of dicyclopentadiene or copolymerization of it with the cationically polymerizable monomer can be carried out by any known methods using Friedel-Crafts polymerization catalysts.

Generally, aluminum halides, titanium halides, tin halides, boron fluoride, and complexes of boron fluoride with alcohols, phenols, carboxylic acids or ethers are used as the Friedel-Crafts polymerization catalysts. Of these, aluminum chloride ($AlCl_3$), and stannic chloride ($SnCl_4$) are preferred.

The polymerization can be carried out in the absence of solvent, or in an inert organic solvent such as an aliphatic or aromatic hydrocarbon, e.g., hexane, heptane, pentane, benzene, toluene or xylene. The polymerization temperature is not critical, but can be varied over a wide range according to the desired degree of polymerization of the polymer or the type of the comonomer. Generally, temperatures of −20° to 100° C., preferably 20° to 80° C., can be employed. The time required for polymerization is neither critical, but can be varied over a wide range. Generally, the polymerization time is 0.5 to 10 hours.

Atmospheric pressure suffices as the polymerization pressure used in the process of this invention, but if desired, the polymerization can be carried out at a reduced or elevated pressure.

The above polymerization process thus yields a polymer having a molecular weight (as measured by vapor pressure osmometry) of about 500 to 1,500, preferably about 600 to 1,300, a bromine number (measured by the method described in Japanese Industrial Standards K-2543) of 20 to 100, preferably 30 to 80, a softening point (JIS K-2531) of 100° to 200° C., and Gardner color hue (ASTM D-1544) of about 8 to 15. The resulting polymer will be referred to as a base polymer in the present application.

According to the process of this invention, an $\alpha,\beta$-unsaturated carboxylic acid or its anhydride is then added to the base polymer. The $\alpha,\gamma$-unsaturated carboxylic acid may be any unsaturated carboxylic acid containing an $\alpha,\beta$-double bond which can be added to the base polymer to form an adduct, and may, for example, be an $\alpha,\beta$-unsaturated carboxylic acid of the following formula

wherein $R_1$, $R_2$ and $R_3$ independently from each other, represent a hydrogen atom or a carboxyl, lower alkyl or carboxy-lower alkyl group. Those containing 3 to 5 carbon atoms are especially suitable.

Typical examples of the $\alpha,\beta$-unsaturated carboxylic acids that can be used in this invention are acrylic acid, methacrylic acid, fumaric acid, maleic acid, maleic anhydride, citraconic acid, citraconic anhydride, itaconic acid, and itaconic anhydride. Of these, maleic acid and maleic anhydride are especially preferred.

Addition of the $\alpha,\beta$-unsaturated carboxylic acid or its anhydride to the base polymer can be easily effected even by simply contacting them with each other at an elevated temperature. The amount of the $\alpha,\beta$-unsaturated carboxylic acid to be added can be 1 to 20% by weight, preferably 1.5 to 15% by weight, more preferably 2 to 10% by weight, based on the weight of the base polymer.

The addition reaction is generally carried out at a temperature of 100° to 300° C., preferably 150 ° to 230° C., for 0.5 to 5 hours, preferably 1 to 4 hours. The reaction can be carried out either in the absence of solvent, or in an organic solvent inert to the reaction. For ease of controlling the rate of reaction and adjusting the viscosity of the reaction mixture within the reaction system, it is preferably carried out in an inert organic solvent. Examples of the inert organic solvents that can be used in this reaction include aliphatic hydrocarbons containing 5 to 10 carbon atoms such as hexane or heptane, aromatic hydrocarbons such as benzene, toluene or xylene, and halogenated aromatic hydrocarbons such as chlorobenzene.

The reaction is usually carried out at atmospheric pressure, but if required, it may be carried out at an elevated or reduced pressure.

The addition reaction sufficiently proceeds by simply heating a mixture of the $\alpha,\beta$-unsaturated carboxylic acid or its anhydride and the base polymer, but if desired, a radical initiator such as peroxides and azo compounds can be used conjointly in the reaction system.

The addition reaction thus yields a polymer containing the $\alpha,\beta$-unsaturated carboxylic acid or its anhydride added thereto and having an acid number of 6 to 105, preferably 8 to 80.

The resulting polymer can be further treated after separation from the reaction mixture, or can be used in the subsequent esterification step without treatment.

The esterification is performed using a polyhydric alcohol containing at least two hydroxyl groups per molecule which can react with carboxyl or carboxylic anhydride groups to form esters.

Suitable polyhydric alcohols that can be used in this invention are those having a low molecular weight, especially aliphatic polyhydric alcohols containing 2 to 10 carbon atoms, more especially 2 to 6 carbon atoms. Examples of the polymeric alcohols are ethylene glycol, diethylene glycol, triethylene glycol, glycercin, and pentaerythritol. Of these, more the diethylene glycol and triethylene glycol are preferred.

The esterification of the base polymer having the $\alpha,\beta$-unsaturated carboxylic acid or its anhydride added thereto need not be carried out to an extent that all of the free carboxyl groups are esterified, but can be effected partially according to the properties required of the resins finally obtained, such as the gloss of the printed surface. Thus, the degree of esterification can be 20 to 100%, preferably 40 to 90%.

The term "degree of esterification", as used in the present specification and appended claims, denotes the molar ratio of the amount of esterified carboxyl groups to that of all carbonyl groups bonded to the resin. In other words, the degree of esterification can be given by the following formula $Z/(X + 2Y + Z)$ wherein X is the amount of mols of the free carboxyl groups bonded to the esterified resin, Y is the amount in mole of the carboxylic anhydride groups bonded to the esterified resin, and Z is the amount in mols of the esterified carboxylic groups. The esterification reaction can be carried out by heating the base polymer having the $\alpha,\beta$-unsaturated carboxylic acid or its anhydride added thereto and the above polyhydric alcohol in the absence of solvent or in an inert organic solvent, for example, an aliphatic hydrocarbon containing 5 to 10 carbon atoms such as hexane or heptane, an aromatic hydrocarbon such as benzene, toluene or xylene or a halogenated aromatic hydrocarbon such as chlorobenzene, at a temperature of 100° to 300° C., preferably 150° to 250° C. for a period of usually 0.5 to 5 hours.

The esterification reaction can also be performed in the presence of a catalytic amount of an ordinary esterification reaction, such as sulfuric acid, p-toluenesulfonic acid, or a metal halide (e.g., aluminum chloride or aluminum bromide).

The resulting resin for printing inks is separated from the reaction mixture in a customary manner by, for example, heating it at a reduced pressure to remove the solvent and the unreacted polyhydric alcohol, and then purified in a customary manner.

The resins for printing inks provided by the present invention have the following properties as determined by the methods described elsewhere in the specification.

| | |
|---|---|
| Softening point: | 130 to 200° C. |
| Molecular weight: | 700 to 2,000 |
| Bromine number: | 35 to 100 |
| Acid number: | 0 to 80 |
| Gardner color hue: | 8 to 18 |
| Degree of esterification: | 20 to 100% |

The resin prepared by the method of this invention has the marked advantages that it has better solubility in aliphatic hydrocarbons than the conventional synthetic resin used as ink vehicles, permits superior dispersion of pigments and gives ink films having very good drying property and gloss. This resin can be used alone or in combination with other natural or synthetic resins, such as rosin or its derivatives, phenolic resins, alkyd resins, or petroleum resins, in the preparation of printing inks. Resins of this invention having a softening point of at least 140° C., preferably at least 150° C., especially exhibit superior characteristics as resins for use in printing inks.

Printing inks using the resins of this invention can be prepared by any customary method.

For example, an ink vehicle of the following formulation was first prepared.

| Composition of the ink vehicle | |
|---|---|
| Resin | 5 to 80, preferably 10 to 50 |
| Drying oil | 0 to 100, preferably 10 to 50 |
| Assistant | 0 to 10, preferably 1 to 5 |
| Solvent | Balance, |
| | (parts by weight) |
| Total | 100 parts by weight |

These ingredients were dissolved at room temperature or at an elevated temperature (200° to 300° C.). The resin may be the resin of this invention alone or in combination with the above-described natural or synthetic resins. The amount of the resin of this invention is desirably 5 to 100% by weight based on the total resin component. The drying oil is generally linseed oil, tung oil, dehydrated castor oil, etc. The assistant may, for example, be aluminum stearate or organic bentonite. The solvent may, for example, be an aliphatic hydrocarbon, such as a mineral oil having a boiling point of 250° to 300° C. or a petroleum fraction having a boiling point of 260° to 290° C.

The ink vehicle so prepared is mixed with a pigment in a mixer, and then, the pre-mix is further kneaded using such a device as roll mill, sand mill, attriter or colloid mill. In order to prepare inks of low viscosity, pre-mixing is not required, but kneading in a ball mill suffices. An assistant and a solvent are added to the kneaded mixture, and they are mixed in a mixer or roll mill. Typical recipes for ink preparation are as follows:

| | |
|---|---|
| Ink vehicle | 40 to 70, preferably 50 to 60 |
| Pigment | 10 to 60, preferably 20 to 40 |
| Assistant | 0 to 15, preferably 1 to 10 |
| Solvent | Balance |
| Total | 100 parts by weight |

Examples of the pigment include organic pigments such as BRILLIANT CARMINE (Pigment Red 57 C.I. 15850), HANSA YELLOW G (Pigment Yellow 1 C.I. 11680), TOLUIDINE RED (Pigment Red 3 C.I. 12120), LITHOL RED (Pigment Red 49 C.I. 15630), PHTHALOCYANINE BLUE (Pigment Blue 15, C.I. 74160), and FAST SKY BLUE (Pigment Blue 17 C.I. 74220); and inorganic pigments such as red lead (D-83-73), zinc flower (D-79-44), titanium oxide (D-476-73), chrome yellow (D-271-67), Iron Blue (D-261-47) and barium sulfate (D-602-42).

Examples of the assistants are processability adjusters (e.g., high viscosity varnish, gel varnish or diluted varnish), dryability adjusters (e.g., a dryer or inhibitor) or usability adjusters (e.g., scratch-proof waxes).

Thus, according to another aspect of this invention, there is provided a printing ink composition comprising (a) 5 to 30% by weight of a resin prepared by adding to a polymer derived from 5 to 100% by weight of dicyclopentadiene and 50 to 0% by weight of a cationically polymerizable monomer 1 to 20% by weight, based on the weight of the polymer, of an $\alpha,\beta$-unsaturated carboxylic acid and then esterifying the resulting adduct at least partially with a polyhydric alcohol, (b) 5 to 30% by weight of a drying oil, (c) 20 to 40% by weight of a pigment, (d) 0 to 10% by weight of an assistant, and (e) a solvent being the balance, the proportions of components (a), (b), (c), (d) and (e) being based on the total weight of the composition.

The printing ink composition of this invention can be use in various printing processes, for example, offset printing, relief printing or gravure printing, and is especially suitable for the offset and relief printing processes.

The following Examples further illustrate the present invention without any intention of limiting its scope.

The properties of the resins obtained in the following Examples were measured by the following methods.

Molecular weight: Vapor pressure osmometry

Softening point (°C): Japanese Industrial Standard (JIS) K-2531

Bromine number ($Br_2$ g/100 g): JIS K-2543

Acid value (KOH mg/g): JIS K-5902

Amount of maleic anhydride added (%): Calculated from the oxygen content of the resin determined by elemental analysis.

Degree of esterification (%): Using an infrared spectrum chart of the resin, the ratio of acid anhydride group/ester group/carboxyl group is obtained from the ratio of light absorbance at 1790/1735/1710 cm$^{-1}$, and the esterification degree is calculated from the formula given hereinabove.

Color hue (Gardner): ASTM D-1544

Solubility: 5 g of the resin dissolved in 5 g of a petroleum- type aliphatic hydrocarbon solvent [(paraffin + naphthene)/aromatics/olefin=74.7/23/2.3 (JIS K-2536); anilinepoint 72.6° C. (JIS K-2256); boiling poing IBP 277° C., EP 310° C. (JIS K-2254)]. The above petroleumtype aliphatic hydrocarbon solvent is further added to the resulting solution to dilute it, and the total weight of the solvent used until the solution begins to become turbid is measured. The solubility is defined as the factor of the total weight of the solvent as against the weight of the resin. The test temperature is 25° C.

The properties of the ink were tested by the following methods.

Drying time: The ink is spread on art paper (100 Kg/1000 sheets) to form an ink film with a thickness of 12 microns, and the time that passes until the ink film no longer sets off is measured.

Gloss: the ratio of mirro surface reflection at an incidence angle and a reflection angle of 60° C after the drying of the ink film Color hue: This is a measure of the dispersed state of the pigment, and evaluated as follows:

|  | Grade | |
|---|---|---|
| $R_{445}/R_{515}$=at least 2.8 | Strongly bluish and deep visually | 5 |
|  | Bluishness not strong visually | 4 |
| $R_{445}/R_{515}$=2.4 – 2.8 |  | 3 |
| $R_{445}/R_{515}$=less than 2.4 | Strongly bluish and deep visually, | 2 |
|  | Bluishness not strong visually | 1 |

($R_{445}$ is the ratio of reflection of light with a wavelength of 445 m$\mu$; $R_{515}$ is the ratio of reflection of light with a wavelength of 515 m$\mu$.)

EXAMPLE 1

3 g of aluminum chloride was suspended in 150 g of toluene, and 300 g of dicyclopentadiene was slowly added to the solution at 30° C. After the reaction, 100 ml. of a 5% aqueous solution of sodium hydroxide was added to stop the reaction, and the reaction mixture was repeatedly washed with water until it became neutral. The solvent and volatile components were distilled off from the organic layer to afford a base polymer having a softening point of 152° C., a molecular weight of 700, a bromine number of 47, and a color hue of 13. 150 g of the base polymer was melted at 200° C., and with stirring, 7.5 g (5% by weight) maleic anhydride was added to react with the base polymer for 1 hour. Then, 8.1 g of diethylene glycol was added to the resulting mixture, and the esterification reaction was performed for 1 hour. After the reaction, the pressure of the reaction system was reduced, and small amounts of volatile components were removed to afford 163 g of a resin for printing inks, which had the following properties.

| Molecular weight: | 750 |
|---|---|
| Softening point: | 170° C. |
| Bromine number: | 47 g/100 g |
| Acid number: | 12 KOH mg/g |
| Amount of maleic anhydride added: | 4.2% |
| Degree of esterification: | 70% |
| Gardner color hue: | 14 |
| Solubility: | Greater than 50 |

The resulting modified resin (100 g) and 50 g of linseed oil were heated at 260° C., and 50 g of a petroleum-type aliphatic hydrocarbon solvent (paraffin naphthene, b.p. 277° to 310° C.) and 4 g of aluminum phosphate were added to form an ink vehicle.

55 g of the vehicle were kneaded by a roll mill together with 18 g of BRILLIANT CARMINE 6B (C.I. 15850), 9 g of calcium carbonate and 1 g of a desiccator. A petroleum-type aliphatic hydrocarbon solvent was added to adjust the inkometer value to 8 to form an offset printing ink. This ink was spread on art paper by an extender and its properties were determined. The results were as follows:

| Drying time: | 20 minutes |
|---|---|
| Gloss: | 53% |
| Color hue: | 5 |

EXAMPLE 2

3 g of aluminum chloride was suspended in 150 g of toluene, and 150 g of dicyclopentadiene and 150 g of a fraction boiling at 140° to 220° C. obtained by the cracking or reforming of petroleum (which consisted of 48% of styrene, indene and vinyl aromatic hydrocarbons with 9 to 12 carbon atoms, 42% of other aromatics, 2% of olefins, less than 1% of diolefins and 7% of paraffins and others) were added at 25° C. to the solution. The reaction was performed for 3 hours. The reaction mixture was treated in the same way as in Example 1 to afford 185 g of a base polymer having a softening point of 150° C. and a Gardner color hue of 10. Maleic anhydride in the amount shown in Table 1 below was reacted with 150 g of the resulting base polymer at 200° C. The reaction product was esterified with diethylene glycol in an equimolar amount to the amount of the maleic anhydride. Thus, resins (A) and (B) were obtained. The properties of the resulting resins are shown in Table 1. Offset printing inks were prepared in the same way as in Example 1 using the resins (A) and (B), and their properties were measured. The results are also shown in Table 1.

Table 1

| Resin | A | B |
|---|---|---|
| Amount of maleic anhydride [g(wt.%)] | 3.0 (2) | 27.8 (15) |
| Molecular weight | 900 | 900 |
| Softening point (° C) | 159 | 176 |
| Bromine number (g/100 g) | 50 | 50 |
| Acid number (KOH mg/g) | 8 | 28 |
| Amount of maleic anhydride added (%) | 1.8 | 9.0 |
| Degree of esterification (%) | 60 | 70 |
| Gardner color hue | 10 | 13 |
| Solubility (times) | above 50 | 6 |
| Drying time (minutes) | 40 | 15 |
| Gloss (%) | 59 | 56 |
| Color hue | 4 | 5 |

EXAMPLE 3

3 g of aluminum chloride was suspended in toluene, and 240 g of dicyclopentadiene and 60 g of 5-isopropenyl norborene were added at 20° C. to the solution. The reaction was performed for 3 hours. The reaction mixture was treated in the same way as in Example 1 to afford 186 g of a base polymer having a softening point of 146° C. and a Gardner color hue of 10. 7.5 g (5% by weight) of maleic anhydride was reacted with 150 g of the base polymer at 200° C. The reaction product was esterified with triethylene glycol or glycerine in an equimolar amount to the amount of maleic anhydride. Thus, resins (C) and (D) were obtained. The properties of these resins are shown in Table 2.

Using these resins (C) and (D), offset printing inks were prepared in the same way as in Example 1, and their properties were determined. The results are shown in Table 2.

Table 2

| Resin | C | D |
|---|---|---|
| Alcohol used in esterification | Triethylene glycol | Glycerine |
| Molecular weight | 730 | 730 |
| Softening point (° C) | 164 | 168 |
| Bromine number (g/100 g) | 63 | 63 |
| Acid number (KOH mg/g) | 11 | 10 |
| Amount of maleic anhydride added (%) | 4.6 | 4.6 |
| Degree of esterification | 75 | 80 |
| Gardner color hue | 11 | 12 |
| Solubility (times) | above 50 | 35 |
| Drying time (minutes) | 35 | 25 |
| Gloss (%) | 55 | 52 |
| Color hue | 5 | 5 |

COMPARATIVE EXAMPLE 1

Using the dicyclopentadiene polymer obtained in Example 1 (resin E), a resin obtained by adding 5% by weight of maleic anhydride to the resin E (resin F), and a resin obtained by esterifying the resin F with ethanol (resin G), offset printing inks were prepared in the same way as in Example 1, and their properties were determined. The results are shown in Table 3.

Table 3

| Resin | Solubility (times) | Drying time (minutes) | Gloss (%) | Color hue |
|---|---|---|---|---|
| E | above 50 | 100 | 40 | 1 |
| F | above 50 | 60 | 45 | 3 |
| G | above 50 | 60 | 46 | 3 |

COMPARATIVE EXAMPLE 2

Maleic anhydride in the amount shown in Table 4 was reacted with 150 g of the dicyclopentadiene polymer obtained in Example 1 at 200° C., and the reaction product was esterified with diethylene glycol in an equimolar amount to the amount of maleic anhydride. Thus, resins (H) and (I) were obtained. Using the resins (H) and (I) offset printing inks were prepared in the same way as in Example 1. The properties of these inks were also determined. The results were shown in Table 4.

Table 4

| Resin | H | I |
|---|---|---|
| Amount of maleic anhydride g(wt.%) | 1.5 (1) | 33.0 (22) |
| Softening point (° C.) | 155 | 177 |
| Gardner color hue | 13 | 16 |
| Acid number (KOH mg/g) | 2 | 35 |
| Solubility (times) | above 50 | below 1 |
| Drying time (minutes) | 60 | Because of poor solubility, a uniform ink could not be formed |
| Gloss (%) | 50 | |
| Color hue | 2 | |

COMPARATIVE EXAMPLE 3

3 g of aluminum chloride was suspended in 150 g of toluene, and 120 g (40% by weight) of dicyclopentadiene and 180 g (60% by weight) styrene were added at 10° C. to the solution. The reaction was performed for 3 hours, and the reaction mixture was treated in the same way as in Example 1 to afford 230 g of a base polymer having a softening point of 142° C. and a Gardner color hue of 9. 7.5 g (5% by weight) of maleic anhydride was reacted with 150 g of this base polymer, and the reaction product was then esterified with 8.1 g of diethylene glycol to afford a resin for use in printing inks. This resin had the following properties.

| | |
|---|---|
| Molecular weight: | 810 |
| Softening point: | 163° C. |
| Bromine number: | 45 g/100 g |
| Acid number: | 11 KOH mg/g |
| Amount of maleic anhydride added: | 3.2% |
| Degree of esterification: | 70% |
| Gardner color hue: | 11 |
| Solubility: | 1.2 times |

Using the resulting resin, an offset printing ink was prepared in the same way as in Example 1. The properties of the ink were determined. The results are shown below.

| | |
|---|---|
| Drying time: | 70 minutes |
| Gloss: | 50% |
| Color hue: | 5 |

COMPARATIVE EXAMPLE 4

Using the phenol-modified rosin, petroleum resin, alkyd resin and polyamide resin respectively shown in Table 5, offset printing inks were prepared in the same way as in Example 1, and the properties of the inks were prepared. The results are shown in Table 5.

Table 5

| | Properties of resins | | Properties of inks | | |
|---|---|---|---|---|---|
| Resins | Softening point (° C) | Solubility (times) | Drying time (min.) | Gloss (%) | Color hue |
| Phenol-modified resin (a) | 172 | below 2 | 45 | 54 | 5 |
| Petroleum resin (b) | 130 | above 50 | 120 | 50 | 1 |
| Alkyd resin (c) | below 50 | 10 | longer than 120 | 56 | 5 |
| Polyamide | 110 | below 2 | Ink preparation | | |

Table 5-continued

| Resins | Properties of resins | | Properties of inks | | |
|---|---|---|---|---|---|
| | Softening point (° C) | Solubility (times) | Drying time (min.) | Gloss (%) | Color hue |
| resin (d) | | | | | impossible |

(a) "Hintanol 270" (a product of Hitachi Chemical)
(b) "PR-G No. 130" (a product of Mitsui Petrochemical)
(c) "PHTHALKYD 365" (a product of Hitachi Chemical)
(d) "HITAMIDE 500" (a product of Hitachi Chemical)

What we claim is:

1. A process for preparing resins for use in printing inks, which comprises
   a. copolymerizing not less than 50% by weight of dicyclopentadiene and not more than 50% by weight of at least one other cationically polymerizable monomer having at least one double bond at a temperature ranging from −20 to 100° C. in the presence of a Friedel-Crafts polymerization catalyst resulting in a copolymer,
   b. reacting 1 to 20% by weight, based on the weight of the resulting copolymer, of an $\alpha,\beta$-unsaturated carboxylic acid or its anhydride with the resulting copolymer, and then
   c. esterifying the resulting adduct to a degree of 20 to 100% with a polyhydric alcohol.

2. The process of claim 1 wherein at least 60% by weight of the dicyclopentadiene and not more than 40% by weight of the cationically polymerizable monomer are used.

3. The process of claim 1 wherein a fraction having a boiling point of 140° to 280° C. and containing 50 to 100% by weight of aromatic hydrocarbons obtained in the cracking or reforming of petroleum is used as said cationically monomer.

4. The process of claim 1 wherein 1.5 to 15% by weight, based on the weight of the polymer, of the $\alpha,\beta$-unsaturated carboxylic acid or its anhydride is added to the resulting polymer.

5. The process of claim 1 wherein said $\alpha,\beta$-unsaturated carboxylic acid contains 3 to 5 carbon atoms.

6. The process of claim 5 wherein said $\alpha,\beta$-unsaturated carboxylic acid or its anhydride is maleic acid or its anhydride.

7. The process of claim 1 wherein said polyhydric alcohol is an aliphatic polyhydric alcohol containing 2 to 6 carbon atoms.

8. The process of claim 7 wherein said polyhydric alcohol is selected from the group consisting of diethylene glycol and triethylene glycol.

9. The process of claim 1 wherein the esterification with the polyhydric alcohol is carried out until the degree of esterification reaches 40 to 90%.

10. The process of claim 3 wherein said fraction has the following composition:

| | |
|---|---|
| styrene, indene and derivatives thereof | 30 to 60% by weight |
| olefins | 5 to 10% by weight |
| aromatics | 20 to 40% by weight |
| paraffins and naphthenes | 10 to 20% by weight |
| diolefins | 0 to 5% by weight. |

11. The process of claim 1 wherein said copolymerization is carried out at a temperature ranging from 20° to 80° C.

12. The process of claim 1 wherein said reaction of the copolymer with the $\alpha,\beta$-unsaturated carboxylic acid or its anhydride is carried out at a temperature ranging from 100° to 300° C.

13. The process of claim 1 wherein said esterification is carried out at a temperature ranging from 100° to 300° C.

14. The process of claim 1 wherein the cationically polymerizable monomer is vinyltoluene, indene, isopropenylnorbornene, or mixtures thereof.

15. The process of claim 2 wherein the cationically polymerizable monomer is present in the copolymer in from 10 to 40% by weight.

* * * * *

UNITED STATES PATENT OFFICE
CERTIFICATE OF CORRECTION

Patent No. 4,028,119           Dated June 7, 1977

Inventor(s) YAMADA, ET AL.

It is certified that error appears in the above-identified patent and that said Letters Patent are hereby corrected as shown below:

Claim 3, line 5, before "monomer", insert -- polymerizable --

Signed and Sealed this

Sixth Day of September 1977

[SEAL]

Attest:

RUTH C. MASON
*Attesting Officer*

LUTRELLE F. PARKER
*Acting Commissioner of Patents and Trademarks*